United States Patent [19]

Earnest et al.

[11] 4,166,361

[45] Sep. 4, 1979

[54] COMPONENTS AND ARRANGEMENT THEREOF FOR BRAYTON-RANKINE TURBINE

[75] Inventors: Ernest R. Earnest, Hobe Sound; Bill Passinos, North Palm Beach, both of Fla.

[73] Assignee: Hydragon Corporation, Lake Park, Fla.

[21] Appl. No.: 832,361

[22] Filed: Sep. 12, 1977

[51] Int. Cl.² ............................................. F02C 7/22
[52] U.S. Cl. ............................................. 60/39.18 R
[58] Field of Search .................. 60/39.18 B, 39.18 R, 60/618; 122/7 B, 7 R

[56] References Cited

U.S. PATENT DOCUMENTS

| | | | |
|---|---|---|---|
| 2,911,789 | 11/1959 | Baker | 60/39.18 B |
| 3,150,487 | 9/1964 | Mangan et al. | 60/39.18 B |
| 4,067,189 | 1/1978 | Earnest | 60/39.18 B |

FOREIGN PATENT DOCUMENTS

| | | | |
|---|---|---|---|
| 469119 | 7/1937 | United Kingdom | 60/39.18 B |
| 646416 | 11/1950 | United Kingdom | 60/39.18 B |

Primary Examiner—Robert E. Garrett
Attorney, Agent, or Firm—Harness, Dickey & Pierce

[57] ABSTRACT

An engine consisting of an open Brayton cycle gas turbine mechanically as well as thermodynamically integrated with a closed cycle Rankine turbine engine is disclosed. The engine heat exchangers, including Rankine vapor generator, regenerator and condenser, are of annular configuration and are concentric with the axis of rotation of the turbomachinery components. A cooling fan is mounted coaxially with the condenser for improved cooling effectiveness. The engine components also are balanced around the gearbox for improved installation and use.

19 Claims, 4 Drawing Figures

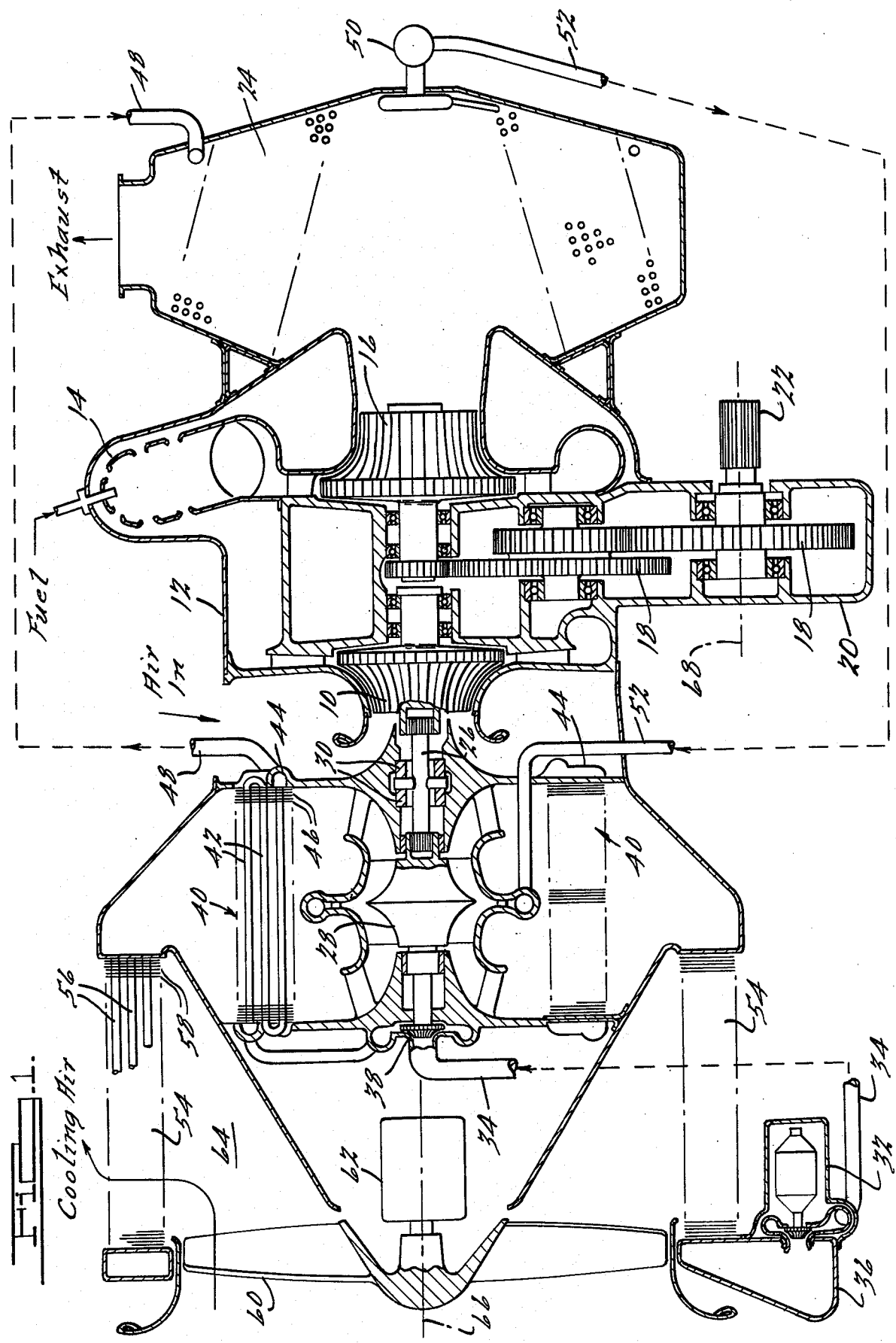

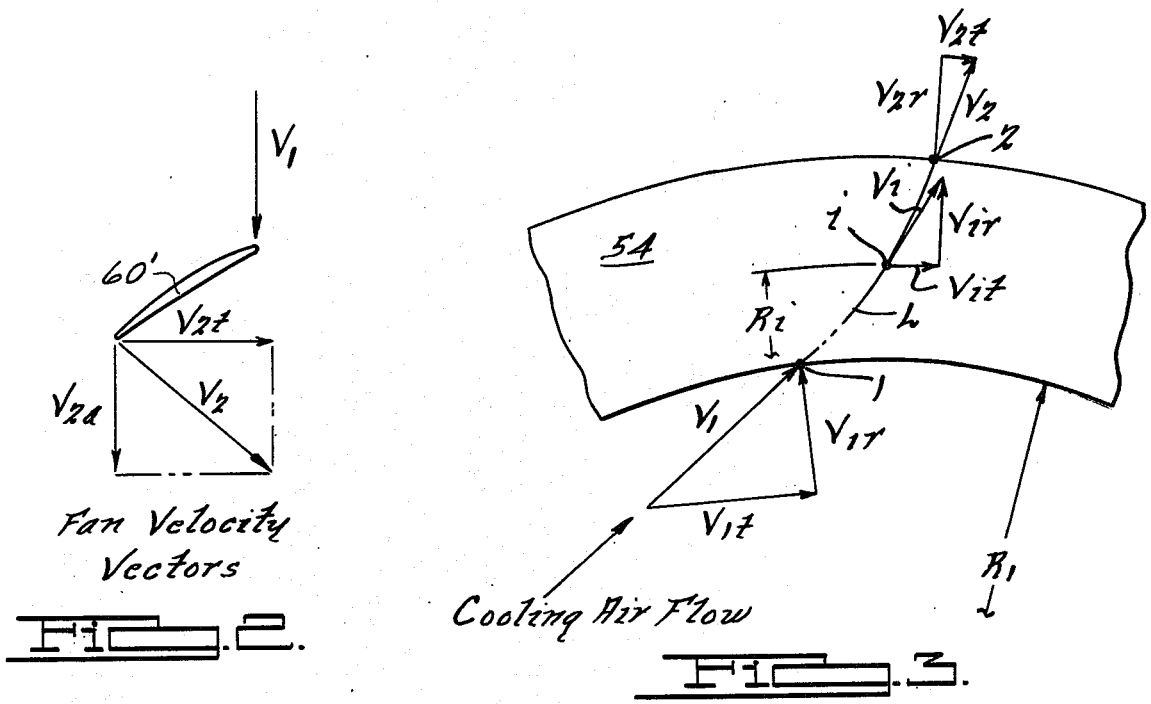
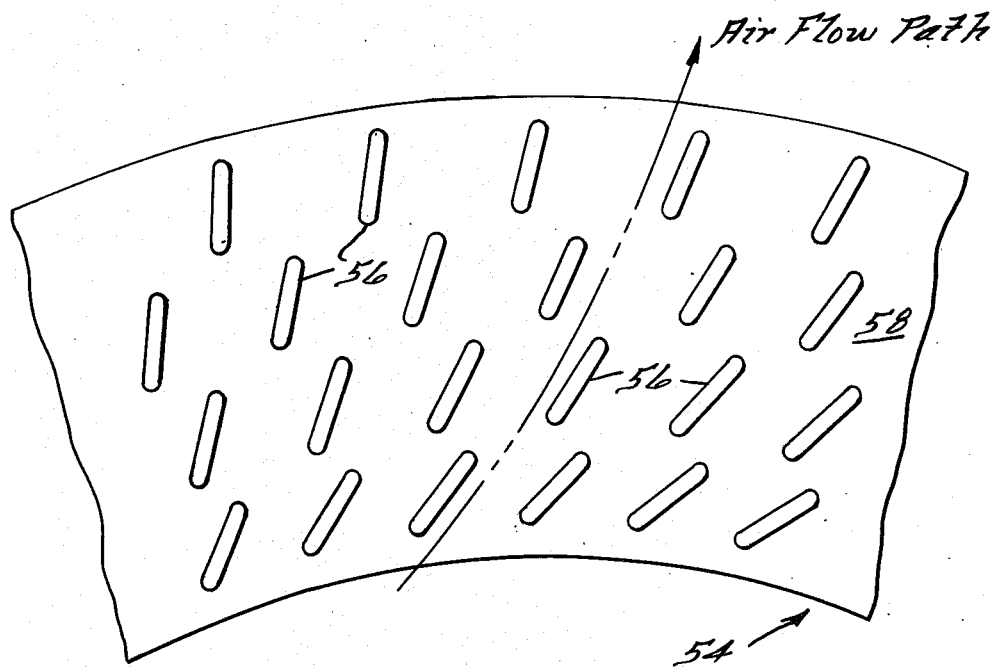

COMPONENTS AND ARRANGEMENT THEREOF FOR BRAYTON-RANKINE TURBINE

BACKGROUND—SUMMARY OF THE INVENTION

The present invention relates to gas turbines of the combined Brayton-Rankine cycle type and particularly to the integrated type in which part or all of the shaft work necessary to drive the Brayton cycle compressor is supplied by the Rankine turbine. Engines of this cycle arrangement have been described in Peterson U.S. Pat. No. 2,955,422.

Combined Brayton-Rankine cycle engines are known to be one of the most thermodynamically efficient of all heat engines. Heretofore, these engines have been used in stationary applications for electric power generation and in marine applications for the propulsion of large ships. These engines are large and complex with little or no mechanical integration between the Brayton gas turbine and Rankine steam turbine components and controls. Also, the Rankine condensers have been water cooled with a separate cooling water sub-system. In general, it would not be practical to scale down these power plants for mobile or vehicular application or where installation space was at a premium, such as on offshore oil rig platforms.

The present invention defines in part a unique integration and arrangement of mechanical components of a combined cycle engine such that the overall package is compact and suitable for mobile application, particularly for wheeled vehicular propulsion. The design features an air-cooled condenser with an engine-driven cooling fan configured to improve cooling effectiveness and reduce parasitic fan power load. The engine turbomachinery components, including the Brayton compressor and turbine, the Rankine turbine and feed pump, and the condenser cooling fan are mounted on a common axis. The heat exchangers have an annular core configuration and are concentrically mounted with the common engine axis. A centrally located engine reduction gearbox is driven by the Brayton power turbine and provides a reduced speed output shaft on an axis parallel to but offset from the primacy engine axis. Also, the gearbox is located at the approximate center of gravity of the engine.

The present invention has as its overall object to improve gas turbine engines, particularly of the integrated combined cycle Brayton-Rankine type. Another object is to provide an efficient and compact Brayton-Rankine combined cycle engine which has a unique integration and arrangement of components. A further object is to provide improved and unique components for such an engine.

Still further objects and advantages of the invention will become apparent upon consideration of the present disclosure and the accompanying drawings.

BRIEF DESCRIPTION OF THE DRAWINGS

FIG. 1 is a cross section of a combined cycle engine in accordance with the present invention;

FIG. 2 is a vector diagram of velocities of airflow entering and leaving the condenser fan;

FIG. 3 is a vector diagram of the velocities of airflow passing through the condenser core; and FIG. 4 is a cross section of a portion of the condenser core showing the orientation of the tubes.

DESCRIPTION OF THE PREFERRED EMBODIMENTS

Referring to FIG. 1, the operation of the combined engine will be described. Air enters the engine compressor 10 and is pressurized to several atmospheres. After passing through a passage in engine housing 12, the pressurized air enters combustion chamber 14 where fuel is injected and ignited to increase the temperature to 1300°–2000° F. depending on the desired engine output power. Hot combustion products are expanded through the power turbine 16. Work is extracted from the power turbine 16 through reduction gearing 18 situated in gearbox 20 to drive output shaft 22. Upon leaving the power turbine 16, preferably at a temperature in the range of 800° to 1400° F., the combustion products pass radially outward through the Rankine fluid vaporizer 24 and are exhausted to the atmosphere. The temperature of the exhaust products is typically in the range of 250° to 400° F.

The Rankine cycle utilizes an organic working fluid, such as pyridine, toluene, or fluorobenzene, circulating in a hermetically sealed closed loop. The closed Rankine loop is penetrated at a single location by rotating shaft 26 used to transmit power from the Rankine turbine 28 to the compressor 10. Double shaft seals 30 are used to seal the Rankine system.

An electric motor driven boost pump 32 delivers the Rankine cylcle fluid via conduit 34 from a receiver 36 to a high pressure feed pump 38. The boost pump motor is preferably of the canned rotor type in which the rotor operates immersed in the working fluid in a hemetically sealed jacket, so that a shaft seal is not required.

The centrifugal boost pump 38 is directly driven by the Rankine turbine 28 and delivers high pressure liquid to the regenerative heat exchanger 40. The regenerator is a cross-counter flow design in which the liquid is contained in round tubes 42. Each tube makes several passes back and forth in an axial plane before discharging into a collector manifold 44. Radial fins 46 are brazed to the tubes 42 to transfer heat on the low pressure vapor side. The regenerator preheats the fluid being delivered to the vaporizer 24. A conduit 48 carries the high pressure liquid to the vaporizer 24.

Utilizing the heat energy from the Brayton combustion products, the Rankine fluid is vaporized and superheated in the vaporizer to a temperature in the range of 600° to 700° F. A throttle valve 50 at the exit of the vaporizer 24 is used to control the Rankine system mass flow rate and temperature level. A conduit 52 transports the high pressure vapor to the Rankine turbine 28.

The Rankine vapor expands through the turbine 28 producing the power required to drive the compressor 10 and feed pump 38. After expansion, the fluid, still in a superheated state, passes through the regenerator 40 and into an annular-shaped condenser 54. The fluid is cooled and condensed while passing through axially-oriented tubes 56 in the annular condenser and is finally returned to the receiver 36.

The core of the condenser 54 is constructed of tubes 56 of oblong cross section brazed into radial fins 58. A fan 60, which is driven by a hydraulic motor 62, pressurizes the plenum 64 within the annular condenser 54 forcing cooling air radially outward through the core. Hydraulic power is supplied to the motor 62 from a pump, not shown, driven from auxiliary gears, not shown, in the reduction gearbox 20. Alternatively, the cooling fan 60 can be driven by an airmotor which in turn is driven by air bled from the compressor case 12.

As disclosed, all of the engine turbomachinery components, including the Brayton compressor 10, the Brayton turbine 16, and Rankine turbine 28, the feed pump 38 and the condenser cooling fan 60 are mounted on a common axis 66. That axis coincides with the axis of shaft 26. The heat exchangers, namely, the regenerative heat exchanger 40, the condenser 54 and the vaporizer 24, are all of an annular core configuration and are concentrically mounted on the common engine axis 66. The gearbox 20 is centrally located in the engine arrangement and provides a reduced speed output shaft 22 on an axis 68 parallel to, but offset from, the primary engine axis 66.

In the Rankine cycle system, a radially inflow, double sided turbine 28 is utilized to reduce turbine exit losses and provide axial thrust balance. The annular regenerator core 40 is mounted concentrically surrounding the turbine 28 in order to reduce the low pressure vapor flow losses and provide uniform flow distribution. Likewise, the concentric arrangement of the condenser core 54 minimizes the vapor side flow losses from the regenerator 40 and assures uniform flow into the condenser core. The concentric arrangement of the heat exchangers 40 and 54 results in a lightweight rigid design with a minimum of joints and closures to be sealed and provides support for the cantilever-arranged condenser core 54 which might otherwise require separate mounting with interconnecting duct work.

The Rankine fluid vaporizer 24 is also rigidly supported from the engine case 12 and provides a direct minimum length flow path for the hot combustion products leaving the power turbine 16. Thus, heat losses are minimized. The preferred embodiment of the vaporizer 24 is in accordance with U.S. Pat. No. 3,874,345. As defined in that patent, the vaporizer annular core consists of parallel multiple path small diameter tubes of equal length arranged in concentric helical coils such that the flow progresses from the outermost coil inward.

The overall arrangement of the engine in accordance with the present invention provides an end for end balance of the heat exchanger weights such that center of gravity of the engine falls approximately at the centrally located gearbox 20. The primary engine mounts, not shown, are located on and integral with the gearbox 20 case on or near the plane of the center of gravity. Mounting from the gearbox 20 is advantageous because the gearcase must be relatively massive and rigid to support the various gears, bearings, shafts and other components utilized therein.

An integrated combined cycle engine configured and constructed as herein described will be extremely advantageous for mobile application. The engine will be light and compact, have significant structural rigidity, and be convenient to mount and install in position. In addition, the configuration of the cooling fan and condenser (as described in more detail below) will provide a bonus in heat exchanger effectiveness and overall engine efficiency.

Typically, heat exchangers constitute a major portion of the weight and volume of a combined cycle Brayton-Rankine engine. The efficiency of the Rankine cycle thus is dependent in part on the effectiveness of the heat exchangers, particularly the condenser, and on the power consumed by the fan. It is therefore desirable to optimize the performance of the fan and condenser within the imposed constraints of desired engine size and weight. The arrangement of fan and condenser in accordance with the present invention optimizes that performance.

FIG. 2 shows the velocity vectors of the air before and after passing through a typical axial flow fan (the fan represented by blade 60'). The exit vector $V_2$ may be divided into an axial component $V_{2a}$ and tangential component $V_{2t}$. In a conventional fan-heat exchanger design it is not possible to utilize the tangential component of the velocity unless turning vanes are added. In the present engine, however, the tangential velocity component is utilized to enhance heat transfer. This is accomplished by designing the condenser core as a radial diffuser.

FIG. 3 shows the velocity diagrams of the flow entering and leaving the condenser core 54. The entering tangential velocity $V_{1t}$ may be determined based on conservation of angular momentum of the flow leaving the fan:

$$V_{1t} = \int V_{fant} dR_{fan}/R_1 \quad (1)$$

In Equation 1, "$V_{fant}$" is the tangential velocity component of the air leaving the fan blade, "$dR_{fan}$" is the derivitive of the radius of the fan, and "$R_1$" is the inner radius of the annular core of the condenser 54. The radial velocity component $V_{1r}$ of the air entering the condenser core 54 may be determined from continuity based on mass flow and radial flow area:

$$V_{1r} = \dot{M}/A_c \rho \quad (2)$$

where "$\dot{M}$" is the mass flow of air through the fan, "$A_c$" is the net flow open area through the core, and "$\rho$" is the density of the air through the fan.

The flow path through the core may be derived by integration of the velocity vectors. The tangential velocity may be computed from the angular momentum allowing for loss of momentum due to frictional drag. In this regard, angular momentum per unit radial thickness ($M_i$) is computed as follows:

$$M_i = M_1 - \int_1^i \frac{Dt}{V} dL \quad (3)$$

In Equation 3, "$M_1$" is the angular momentum at point "1" in FIG. 3 (the inlet to the condenser core), "Dt" is the tangential component of the frictional drag per unit radial thickness, "L" is the path length of the air flow through the core and V is the velocity vector through the core along the flow path.

The tangential velocity at any point along the core then is determined in accordance with Equation 4:

$$V_{it} = M_i/R_i \rho \quad (4)$$

where "$R_i$" is the radius of the core to point "i" in FIG. 3. The radial velocity $V_{ir}$ is again computed by the continuity equation (Equation 2) allowing for changes in flow area. The radial and tangential velocity vector ($V_{ir}$ and $V_{it}$) are combined to determine the true velocity vector ($V_i$) at any point along the flow path.

Calculation of the true velocity vector "$V_i$" at various points in the condenser core 54 determines the predicted flow path for the air through the core. The oblong (flat) tubes 56 of the condenser 54 are then oriented to align with the predicted flow path for minimum flow blockage. This is shown in FIG. 4. The radial fins 58 of the condenser 54 serve as vaneless diffusers acting to reduce the flow velocity and minimize the exit dump loss. The dump loss is proportional to the exit velocity vector "V$_2$" and is defined by Equation 5:

$$\dot{M}V_2^2/2g \tag{5}$$

where "g" is the gravitation constant.

As with a more conventional heat exchanger, the energy expended in frictional drag is directly related to the heat transfer and the generation of the convective film coefficient. However, by reducing the exit dump loss, the overall heat exchanger flow loss may be reduced for equal heat transfer performance and lower fan work will be required. To summarize, the overall effectiveness of the fan-condenser design is improved over conventional designs by the utilization of the tangential swirl velocity of the fan discharge and by causing the condenser cooling fins to act as radial diffusers and reduce core dump loss. This improved effectiveness may be used to reduce the required fan work, or to improve heat transfer performance, or both.

While it will be apparent that the preferred embodiments illustrated herein are well calculated to fulfill the objectives above stated, it will be appreciated that the present invention is susceptible to modification, variation and change without departing from the scope of the invention, as defined by the following claims.

We claim:

1. An integrated combined Brayton cycle-Rankine cycle engine comprising a Rankine turbine and a rotary compressor driven thereby, a fuel system and combustor operating on air supplied by said compressor, a Brayton power turbine operating on products from said combustor, a Rankine fluid vaporizer heated by the exhaust products of said Brayton power turbine, a rotary feed pump driven by said Rankine turbine for circulating said Rankine fluid, a regenerator for recovering heat from said Rankine fluid leaving said Rankine turbine and for preheating said Rankine fluid supplied to said vaporizer, and a condenser for cooling and liquifying the fluid in the Rankine cycle system after the fluid passes through the regenerator, said Rankine turbine, compressor, Brayton power turbine, and feed pump all mounted on a common axis, and said vaporizer, condenser, and regenerator each having an annular core configuration and each mounted concentrically about said common axis.

2. The engine as set forth in claim 1 further comprising a speed reduction gearbox positioned between the compressor and power turbine and having an output shaft parallel to, but offset from, said common axis.

3. The engine as set forth in claim 1 further comprising a gearbox driven by said Brayton power turbine and located at the center of gravity of said engine.

4. The engine as set forth in claim 1 wherein said Rankine turbine comprises an axially thrust balanced double sided radial inflow turbine.

5. The engine as set forth in claim 1 wherein said regenerator is mounted concentrically with said Rankine turbine and surrounds it.

6. The engine as set forth in claim 1 further comprising an annular duct interconnecting said regenerator and condenser, said duct supporting said condenser as a cantilever.

7. The engine as set forth in claim 1 further comprising a cooling fan mounted on said common axis.

8. The engine as set forth in claim 7 wherein said condenser is mounted concentrically about said cooling fan.

9. The engine as set forth in claim 8 wherein said condenser is a diffuser for the cooling fan.

10. The engine as set forth in claim 7 wherein said annular condenser is comprised of a plurality of tubes with oblong cross-sections and a plurality of annular radial fins, the axis of said tubes being parallel to said common axis.

11. The engine as set forth in claim 10 wherein said tubes are oriented so as to align the longer sides of their oblong cross-sections with the flow of air passing through said condenser.

12. The engine as set forth in claim 11 further comprising a cooling fan mounted on said common axis, said cooling fan providing said flow of air through said condenser.

13. The engine as set forth in claim 12 wherein the alignment of said tubes is determined by the computed flow direction of the cooling air based on entering angular momentum and frictional drag.

14. The engine as set forth in claim 3 wherein the mounts for said engine are located on said gearbox.

15. An integrated combined cycle Brayton-Rankine engine comprising a Rankine turbine and a rotary compressor driven thereby, a Brayton turbine and an intercycle heat exchanger heated by the exhaust of said Brayton turbine and delivering heat to the Rankine fluid for powering said Rankine turbine, a combustor and air supply assembly for delivering to said Brayton turbine air from said compressor together with products of combustion from said combustor, a condenser for cooling said Rankine fluid leaving the Rankine turbine, and a cooling fan for passing air through the condenser, said condenser comprising a plurality of axially extending tubes and radially extending fins forming an annular core, said tubes having cross sections aligned to maximize the flow of air from said cooling fan through said condensor.

16. The engine as set forth in claim 15 wherein said tubes have oblong cross-sections and the longer sides of said cross-sections are aligned with the flow of air passing through said condenser.

17. The engine as set forth in claim 15 wherein said condenser is mounted concentrically about said cooling fan and surrounds it.

18. The engine as set forth in claim 15 wherein said Rankine turbine, compressor and Brayton turbine are mounted on a common axis and said heat exchanger and condenser are each mounted concentrically about said common axis.

19. The engine as set forth in claim 18 further comprising a regenerator for recovering heat from said Rankine fluid leaving said Rankine turbine and for preheating said Rankine fluid supplied to said heat exchanger, said regenerator having an annular core configuration and mounted concentrically about said common axis.

* * * * *